Patented Aug. 18, 1925.

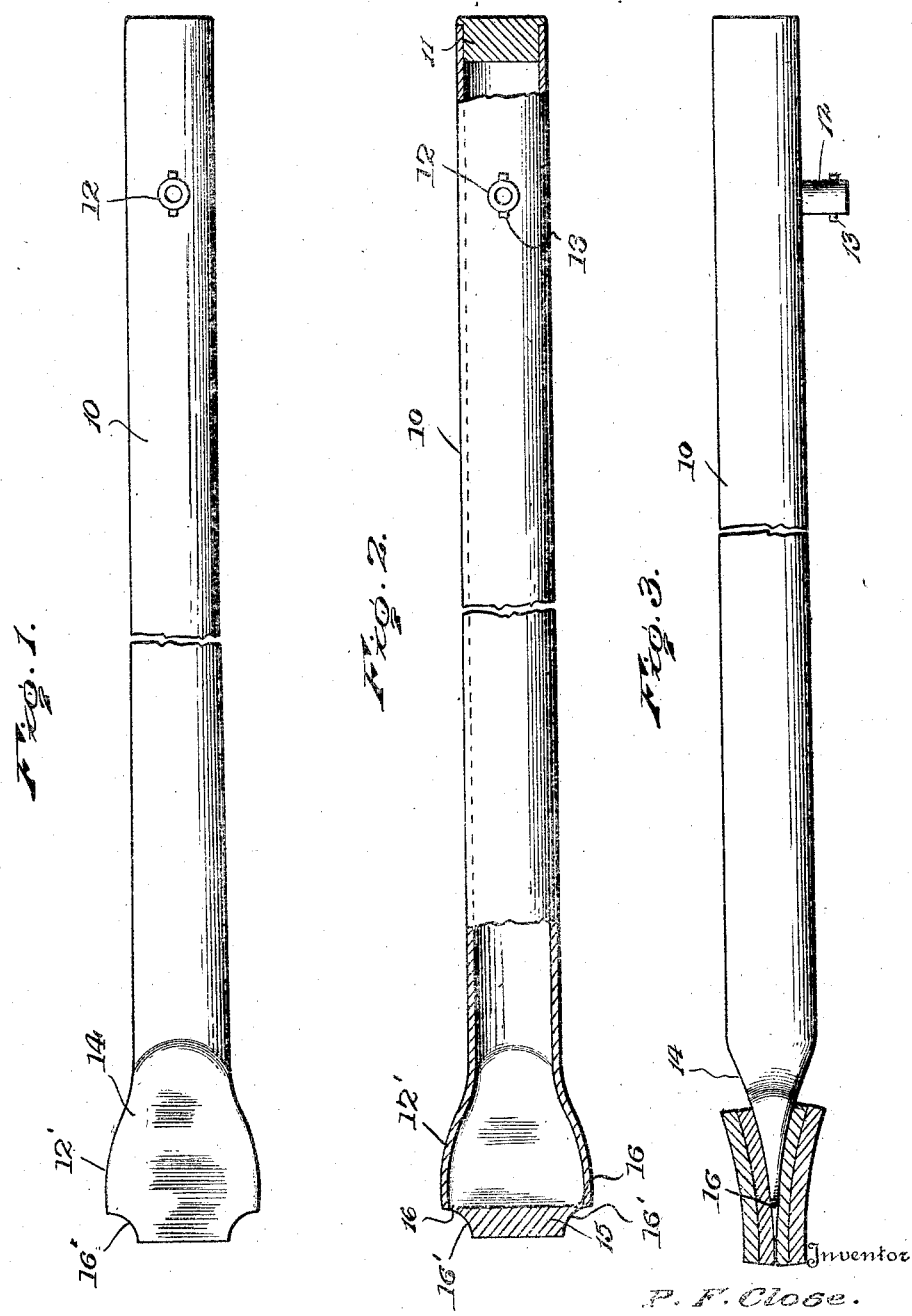

1,550,208

UNITED STATES PATENT OFFICE.

PERRY F. CLOSE, OF MEDFORD, OREGON.

VEHICLE-SPRING LUBRICATOR.

Application filed September 4, 1923. Serial No. 660,747.

*To all whom it may concern:*

Be it known that I, PERRY F. CLOSE, a citizen of the United States, residing at Medford, in the county of Jackson and State of Oregon, have invented certain new and useful Improvements in Vehicle-Spring Lubricators, of which the following is a specification.

The present invention relates to a tool for lubricating vehicle springs and more particularly automobile springs such as are built up in layers. It is a well-known fact that the leaves of such springs are very difficult to lubricate as, with an ordinary squirt oiler, the lubricant seldom passes beyond the edges of the leaves and hardly ever enters between them to reach the middle portion thereof.

The main object of this invention is now to provide a lubricator constructed conveniently to handle and adapted to wedge in between the leaves of the springs to spread them slightly apart when squirting the lubricant between them.

Another object of the invention is to give the tool such a length that the springs can be reached from the side of the vehicle through or at the side of the wheels or could even be made long enough to reach from one side of the vehicle to the springs situated at the opposite side thereof.

In the accompanying drawing, one embodiment of the invention is illustrated; and—

Figure 1 is a plan view of the lubricator;

Fig. 2 is a similar view to Fig. 1, with some parts in section; and

Fig. 3 is a side elevation of the lubricator.

The tool consists of a long shank 10 preferably made from steel tubing of good quality. One end of the tube is tightly closed by a plug 11, which is preferably welded into the tube. At a short distance from the plug end is a nipple 12, opening into the interior thereof. The free end of this nipple has a pair of small projections 13 adapted to engage with a grease gun, Alemite gun, or large grease cup for supplying lubricant to the tool.

The working end of the tube is flattened in the form of a wedge-shaped head 14, and has an insert or blade 15 of tempered steel preferably welded between the flattened sides of the tube. In this manner, a chisel is produced at the working end of the tool. The inserted steel blade 15 is slightly narrower than the width of the wedge portion 14 in order to furnish a small port 16 at each end of the blade 15, through which the lubricant is discharged when the tool is in operation.

When using the lubricator, an alemite or grease gun is secured to the nipple 12, and the lubricant is introduced into the tubular shank 10 until the latter is filled. The chisel end of the tool is now inserted between two leaves of a leaf spring, as indicated in Figure 3, so that the edges are spread apart or opened when, upon pressure being applied to the lubricant by the operation of the grease gun or alemite gun, grease is thereupon forced out through the apertures 16 to completely fill the space between two leaves of the spring.

The lubricator is of such a size and shape that it may conveniently be carried in the tool box under the seat of an automobile, and has the advantage of considerably simplifying the lubrication of the springs, which is ordinarily a very difficult operation even when using powerful grease guns. The lubricator is of sufficient stiffness to permit hammer blows to be applied on the plug end of the lubricator when driving the chisel end thereof in between the spring leaves. By reference to Figs. 2 and 3 of the drawing, it will be noted that the top and bottom walls of the tool at the entering end thereof converge in the direction of the blade 15, while the side walls of the tool between said converging top and bottom walls are curved or expanded laterally at 12' so as to provide a relatively large wedge-shaped head for insertion between the leaves of the springs to be lubricated. It will also be noted that the opposite ends of the insert or blade 15 are curved in the direction of the ports 16, as indicated at 16', so as to provide a clearance for the discharge of the lubricant through said ports. Inasmuch as the free edge of the blade 15 is of less width than the wedge-shaped head of the tool and projects longitudinally beyond the ports 16 with the ends of the blade curved in the direction of said ports, it will be apparent that the tool may be readily inserted between the leaves of a spring without liability of the ports becoming clogged or otherwise obstructed.

It is evident that the lubrication of the springs will, in this manner, take place in a much shorter time and be much better performed than by other methods now used.

Besides the convenience when using this tool, the lubrication can take place with utmost cleanliness as the operator's hands need never come in contact with the grease. On account of the considerable length given to the tool, it is not necessary to crawl under the car or between the wheels and springs, to operate it. One may stand in an upright position clear of any dirt or lubricant about the car. Only a few minutes are necessary to grease the springs of an automobile thoroughly.

Having thus described the invention, what is claimed as new is:

1. A leaf-spring lubricator comprising an elongated tubular shank closed at one end and having its opposite end provided with an entering head formed with converging top and bottom walls and laterally expanded side walls between the top and bottom walls, a narrow flat thin blade inserted between and permanently united with the edges of the top and bottom walls, the ends of said blade being spaced from the side walls whereby to define spaced discharge ports opening through the end of said head, the ends of the blade being curved in the direction of the ports to provide a clearance, and means adjacent the rear closed end of the shank for connection with a lubricant gun.

2. A leaf-spring lubricator comprising an elongated tubular shank closed at one end and having its opposite end provided with an enlarged wedge-shaped entering head having converging top and bottom walls and laterally expanded side walls between said top and bottom walls, a narrow flat thin blade of less width than the head inserted between and permanently united with the edges of the top and bottom walls, the ends of said blade being spaced from the side walls whereby to define spaced discharge ports opening through the end of the head at opposite sides thereof, the free edge of the blade being projected longitudinally beyond the ports and the opposite ends thereof being curved in the direction of said ports to provide a clearance for the lubricant, and means adjacent the rear closed end of the shank for connection with a lubricant gun.

In testimony whereof I affix my signature.

PERRY F. CLOSE. [L. S.]